July 17, 1934.     W. K. MASON     1,966,730
MULTIPLE ALARM SYSTEM
Filed May 20, 1930     3 Sheets-Sheet 1

Inventor:
William K. Mason,
by Wright Brown Quinby May
Attys.

July 17, 1934. W. K. MASON 1,966,730
MULTIPLE ALARM SYSTEM
Filed May 20, 1930 3 Sheets-Sheet 2

Inventor:
William K. Mason
by Wright Brown Quinby May
Attys.

July 17, 1934.  W. K. MASON  1,966,730
MULTIPLE ALARM SYSTEM
Filed May 20, 1930   3 Sheets-Sheet 3
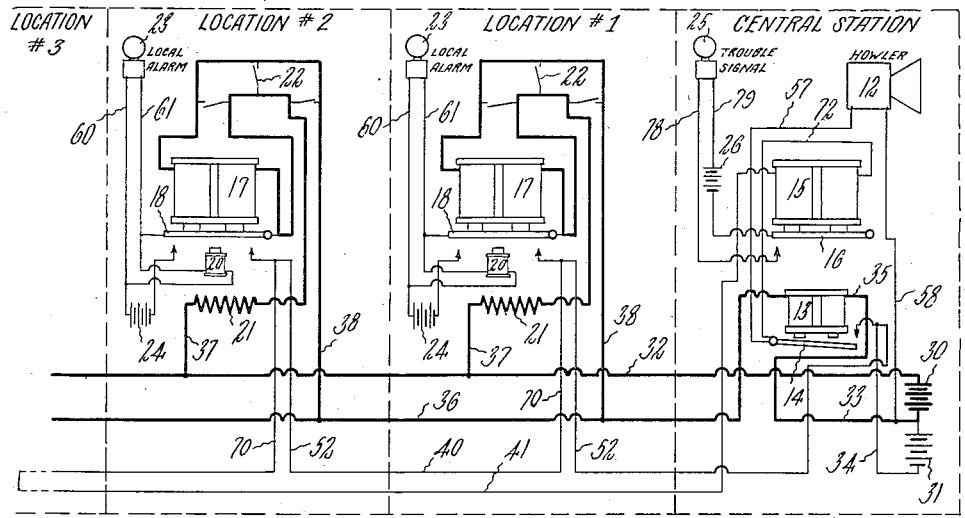
First Supervisory Circuit shown in heavy lines.  Fig. 9.
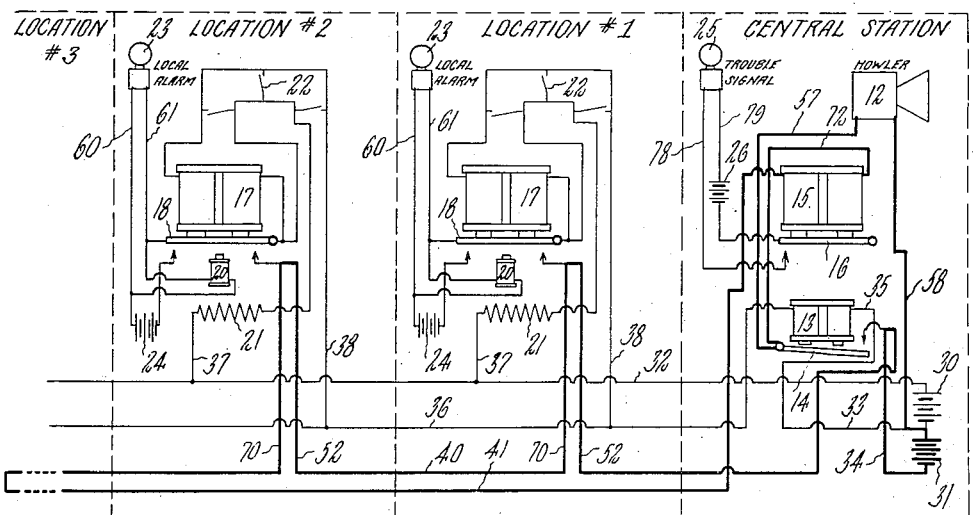
Second Supervisory Circuit shown in heavy lines.  Fig. 10.
Inventor
William K. Mason
by Wright, Brown, Quinby & May
Attys.

Patented July 17, 1934

1,966,730

UNITED STATES PATENT OFFICE 1,966,730

MULTIPLE ALARM SYSTEM

William K. Mason, Malden, Mass., assignor to American Electrical Company, Boston, Mass., a corporation of Massachusetts Application May 20, 1930, Serial No. 454,009

3 Claims. (Cl. 177—314)

This invention relates to automatic alarm systems, such as burglar, fire, etc., which may be employed to protect a large number of places by detecting switches or other elements responsive to a predetermined kind or kinds of disturbance such as excessive temperature to set off a central alarm or signal, and to indicate the location of any disturbance which sets off the alarm, the system employing only a very few trunk wires to the central station. According to the invention, location bells or equivalent signals are conveniently placed adjacent to each locality to be protected, as, for example, over the door of each room to which a system embodying the invention extends. In combination with the local signal at each room is a relay connected in such a way as to keep the local and central signals operating after they have been started by the closing of a detecting switch, whether or not the switch itself is subsequently destroyed or otherwise rendered inoperative. The invention furthermore may include, in addition to the use of central and local signals as described, means for supervising the wires and apparatus thus protecting the alarm circuit and calling attention to the location as well as the existence of failure therein. The system when supervised requires an additional trunk wire. According to the invention, the local signals may be used both as location signals to direct attention to the locality of a disturbance, and as a trouble signal to respond to a failure in any portion of the local wiring with the exception of its own circuit which is normally open.

The invention may, moreover, be embodied in a more elaborate alarm system in which every wire and instrument in the system will be supervised; that is, the failure of any part of the entire system (except, of course, portions of the trouble circuits themselves) will actuate a trouble signal to give automatic notice of the failure and its approximate location. In this embodiment of the invention a pair of trunk wires extend from a central station to all the locations to be protected, a relay magnet being connected across the two trunk wires at each location. A normally open short-circuiting shunt is provided around each said relay magnet to deenergize the magnet when the shunt is closed by the action of a thermostatic switch or equivalent detector connected in the shunt. In order to prevent the closing of one shunt from short-circuiting all the relay magnets connected across the two trunk wires, each magnet is connected in series with a resistance unit which is so connected as not to be short-circuited with its corresponding magnet by the closing of the shunt circuit around the magnet. A third trunk wire may be provided for a circuit to cause the central alarm signal to be actuated when any of the relay magnets is short-circuited. A fourth trunk wire may be used to supervise those portions of the system which do not supervise each other. Thus a completely supervised multiple system may be constructed with only four trunk wires, the system being adapted to respond to a particular kind or kinds of disturbance by automatically actuating a central alarm signal and also a local signal at or near the location of the disturbance. According to the invention, the local signals may also be utilized as trouble signals to call attention to any failure of any portion of the system. In other words, the invention may be embodied in a system comprising two separate supervisory circuits, each circuit having therein one or more supervisory relay magnets. The circuits are so arranged that when anything happens, as a failure of some wire in the system or the closing of a detecting switch, the circuits interact to sound a suitable alarm signal.

A number of such systems may furthermore be combined into a more comprehensive system having a single central station responding to a disturbance anywhere in any of the connected systems. For example, a supervised system may be installed separately on each floor of a large hotel or office building, a local relay magnet being placed in every room. Each system would have its own alarm and would be entirely independent of the other systems. The several systems could, however, be connected into a single combined system having a central station responsive to disturbances in any part of the entire building.

For a more complete understanding of the invention, reference may be had to the following description of certain embodiments thereof, and to the drawings, of which,—

Figures 9 and 10 are wiring diagrams of the apparatus shown in Figure 1, the two supervisory circuits being shown respectively in heavy lines in these figures.

Figures 1, 2, 3, 4:
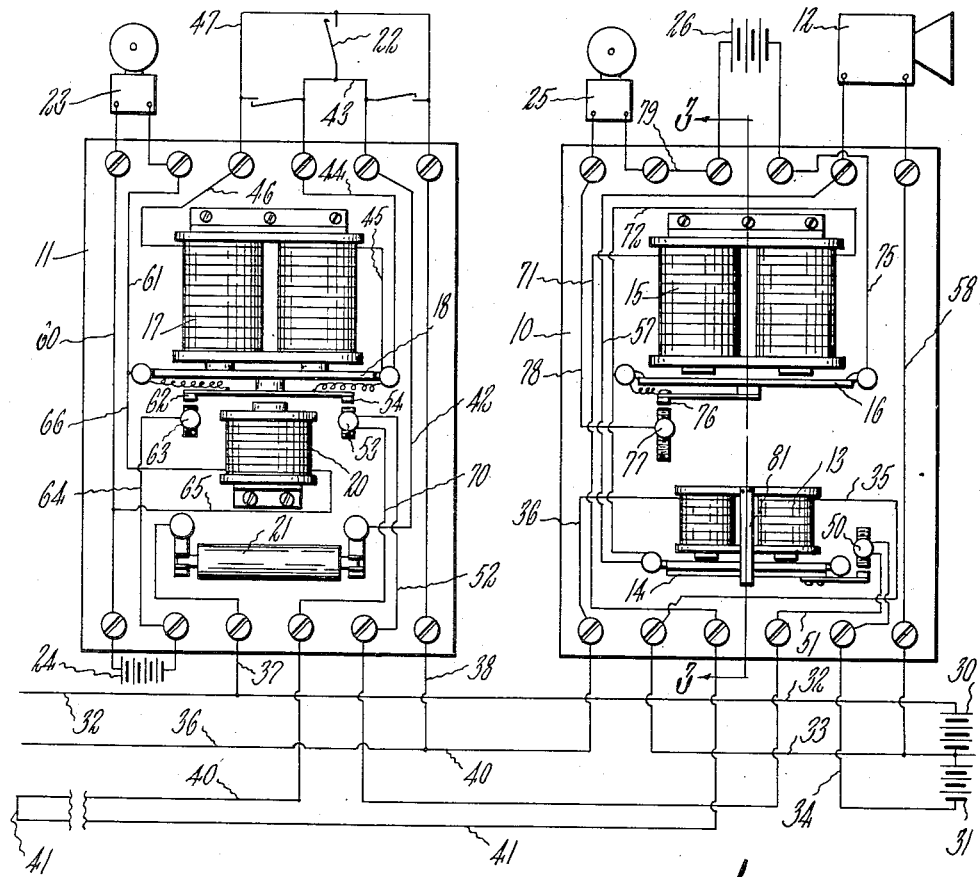
Figure 1 is a wiring diagram of a portion of a system embodying the invention.
Figures 2, 3 and 4 are side elevations of portions of the apparatus shown in Figure 1.

Referring to the drawings in detail, Figure 1 represents a portion of a multiple automatic signal system including a master panel 10 and any desired number of local panels, one of which is indicated at 11. Connected to the master panel 10 is a central alarm signal 12 which may be a bell, siren, light, or any other signals or combinations thereof. For convenience, the signal 12 is hereinafter referred to as a "howler." For the actuation of the howler 12 a magnet 13 may be mounted on the master panel 10, this magnet being provided with a movable armature 14. This magnet is preferably a low resistance magnet having, for example, a resistance of the order of 0.3 ohms. Also mounted on the master panel, an alarm supervisory relay magnet 15 may be provided for purposes hereinafter set forth, this magnet having a movable armature 16.

The local panels 11 may be identical in construction so that a description of the one illustrated in Figure 1 will suffice for all. This panel may have a local supervisory relay magnet 17 mounted thereon, the magnet being provided with a movable armature 18. Below the magnet 17 may be mounted an auxiliary magnet 20. The panel may also carry a suitable resistance unit 21, this unit preferably having a resistance of the same order as that of the magnets 15 and 17. For example, this resistance may be of the order of 300 ohms. Associated with the relay magnet 17 are a number of normally open switches 22, the closing of any one of which is adapted to short circuit the magnet 17. These switches may be of any suitable kind for the purpose or purposes desired, each switch being responsive to some predetermined disturbance such as excessive temperature, the opening of a window, door, etc. or any other abnormal condition. Any desired number of such elements may be connected around the magnet 17, the elements being all responsive to the same type of disturbance or, if desired, being responsive to different types of disturbance. Connected with each local panel 11, a location bell or other signal 23 is provided, this signal being supplied with a local source of energy, such as a battery 24. As hereinafter explained, the local signal 23 may not only have the function of calling attention to the location of a disturbance by operating simultaneously with the howler 12, but may also act as a trouble signal if any of the apparatus on or associated with the panel 11 fails. A similar trouble signal 25 may be provided for the master panel 10, this signal having its separate source of energy such as a battery 26.

The energy for the system as a whole may be provided from a pair of sources, such, for example, as batteries 30 and 31. These batteries, as shown in Figure 1, may be connected together so that three wires 32, 33 and 34 lead therefrom. The wire 32 is one of the trunk wires extending to all the localities protected by the system. The wire 33 leads to the master panel 10 and is connected, as by a wire 35, through the magnet 13 to a wire 36. The wire 36 extends from the master panel throughout the system and is the second trunk wire of the system. From the trunk wires 32 and 36 branch wires 37 and 38, respectively, are tapped off for each local panel 11, the several local panels thus being connected in parallel to these trunk wires. Two additional trunk wires 40 and 41 are provided, these wires being part of a normally closed supervising circuit which extends to each of the panels 11 and includes the supervising magnet 15 on the master panel 10.

For convenience in description a number of circuits are hereinafter outlined, several of the circuits overlapping each other to some extent. These circuits are as follows:

Circuit A starts from the battery 30, extends along the trunk wire 32, enters each panel 11 by the branch wire 37 which connects with the resistance unit 21. Thence the circuit extends through a wire 42 on the panel to a wire 43 which may be extended through the room or other location corresponding to the panel 11 and which is connected to one element of each switch 22. The wire 43 returns to the panel and is there connected with a wire 44 which leads to the armature 18 of the magnet 17, thence through a wire 45 to the windings of the magnet 17, thence through a connecting wire 46 to a wire 47 which leaves the panel and is connected with the other elements of the switches 22, all the switches 22 associated with a local panel 11 being connected in multiple between the wires 43 and 47. The wire 47 is connected directly through the wire 38 to the trunk wire 36. The latter leads through the windings of the magnet 13 and the connecting wire 35 to the wire 33 which is connected to the other pole of the battery 30 and thus completes circuit A. This may be called the first supervisory circuit as it includes the relay magnets 17, which, as shown, supervise their local stations.

Circuit B starts from the battery 31 along the wire 34 to a contact point 50 and thence through a connecting wire 51 to the trunk wire 40 by which it enters the panel 11. The panel itself is connected through a connecting wire 52 to a contact point 53. Between the contact point 53 and a corresponding point 54 which is carried by and connected with the armature 18 is a normal break in the circuit. From the armature 18 the circuit continues through the wire 44 to the wire 43 and thence through any one of the switches 22 which may be close to the wire 47. From this wire the circuit returns through the wire 38, the wire 36, the magnet 13, the wire 35 and the wire 33 to the battery 31.

Circuit C starts from the battery 31 by the wire 34 and extends to the contact point 50. There is normally a break in this circuit between this point and the armature 14. The circuit extends from the armature 14 through a wire 57 to the howler 12 and returns by a wire 58 and the wire 33 to the battery 31.

Circuit D is a local trouble circuit and starts with a battery 24. This circuit extends through a wire 60 to the trouble bell 23 and thence by a wire 61 to the armature 18. The armature 18 carries and is connected with a second contact point 62 which is adapted to come in contact with a corresponding point 63 when the armature 18 drops. The circuit extends from the point 63 through a wire 63 back to the battery 24. Connected in this circuit in parallel with the bell 23 is the magnet 20, this magnet being connected with the wire 60, as by a branch wire 65, and with the wire 61, as by a branch wire 66, so that when contact is made between the points 62, 63 the circuit is simultaneously closed through the bell 23 and the magnet 20.

Circuit E starts from the battery 31 by the wire 34, thence by a wire 71 to the contact point 50, thence by the wire 51 to the trunk wire 40 which loops into each location to contact with the several switch poles 53, each such loop consisting of wires 52 and 70. Thus the contact points 53 of all the successive local panels 11 are connected in series in the trunk wire 40. After the circuit has passed through the most remote local panel, it returns, as by the trunk wire 41 to the master panel 10 where it extends through a wire 71 to the windings of the magnet 15, and thence through a wire 72 to the armature 14 which, in turn, is connected by the wire 57 to the howler 12, the wire 58 and back to the battery 31 by the wire 33. This circuit is entirely distinct from circuit A, and may be termed the secondary supervisory circuit.

Circuit F starts with the battery 26 and extends through a wire 75 to the armature 16 through which it passes to a contact point 76 carried by the armature and adapted to contact with a corresponding point 77. From the contact point 77 a wire 78 leads to the bell 25 from which the circuit returns by a wire 79 to the battery 26.

The operation of these circuits is as follows: Circuit A is a normally closed circuit which extends through the windings of the low resistance magnet 13 and the high resistance magnet 17, as well as the resistance unit 21. Since this circuit includes the high resistance of the magnet 17 and the unit 21, the current therein is relatively feeble and is insufficient to operatively energize the magnet 13, but is sufficient to operatively energize the magnet 17, so that normally the armature 14 is in its lower position, as shown in Figure 1, while the armature 18 is normally raised as shown in the same figure. Deenergization of the magnet 17 for any cause will bring the points 62, 63 into contact, thus closing circuit D so as to cause the trouble or location bell 23 to sound. The closing of this circuit also energizes the magnet 20 which thereupon exerts a downward attraction on the armature 18 and holds it against any possible counter attraction of the magnet 17 in case the deenergization of the magnet 17 is of a temporary character.

Deenergization of the magnet 17 can be brought about in two ways, first by failure of any portion of the circuit A. Thus if the battery 31 becomes too weak, or if any of the wires or instruments in the circuit A fail, the circuit opens and deenergizes the magnet 17, thus sounding the trouble bell. Although the falling of the armature 18 closes not only the contacts 62, 63, but also the contacts 53, 54, when there is a failure in the circuit A, this does not operate the howler 12 since the open switches 22 are in the howler circuit.

The second way in which the magnet 17 may be deenergized is by short circuiting the magnet through any one of the switches 22. The closing of any of these switches provides a low resistance path for the current in circuit A which cuts the current through the magnet 17 to almost zero, and thus results in the falling of the armature 18. When the magnet 17 is short circuited by the closing of a switch 22, this short circuit would also deenergize all the magnets 17 of the different local panels in a system, were it not for the high resistance unit 21 which is in series with the switches 22. The presence of this resistance unit prevents a short circuit between the trunk wires 32 and 36 such as would deenergize all the magnets 17 and thus cause all the local bells 23 to ring when any one switch 22 is closed. The resistance unit 21, therefore, localizes the action of the system to one room or location which includes the active switch 22. The falling of the armature 18 closes the circuit D, as previously described, so that the local bell 23 sounds. At the same time the circuit B is also closed, this bringing substantially the full voltage of the battery 31 to bear on the low resistance magnet 13. The armature 14 is thus raised, connecting it with the contact point 50, and thus closing circuit C which connects the howler 12 directly with the battery 31. When the armature 14 is raised by energization of the magnet 13 so as to close the circuit C which operates the howler 12, it may be desirable to maintain the howler circuit closed, even if something happens to open the circuit A after it has energized the magnet 13. To this end a spring 80 may be mounted adjacent to the magnet 13, the lower end of the spring having an inturned portion 81 on which the armature 14 normally rests when in its lower position, as shown in Figure 3. The spring may be shaped with an inwardly sloping portion 82 adapted to press the armature 14 resiliently upwardly when the armature is raised to its upper position, as in Figure 4. Thus when the armature 14 has been raised to close the howler circuit C, this circuit remains closed until opened by hand. Thus the closing of any one of the switches 22 connected with a panel 11 results in the simultaneous actuation of the local signal 23 and howler 12. The latter gives the alarm while the former indicates the location of the disturbance.

In order to supervise certain portions of the circuit B which are included in and supervised by the circuit A, the supervising circuit E is provided. This is a normally closed circuit extending through the high resistance magnet 15. Since this magnet is operatively energized by a small current its armature 16 is normally in its upper position, as shown in Figure 1, so that the contact 76, 77 is normally open. In case of failure of the wire 52 on any local panel, the wire 51 on the master panel, or any other portion of the circuit, including the battery 31, the magnet 15 is deenergized, closing the contact 76, 77 and causing the trouble bell 25 to sound. Thus every wire and every instrument of the system, with the exception of portions of the trouble signals themselves, are fully supervised.

Figure 5:
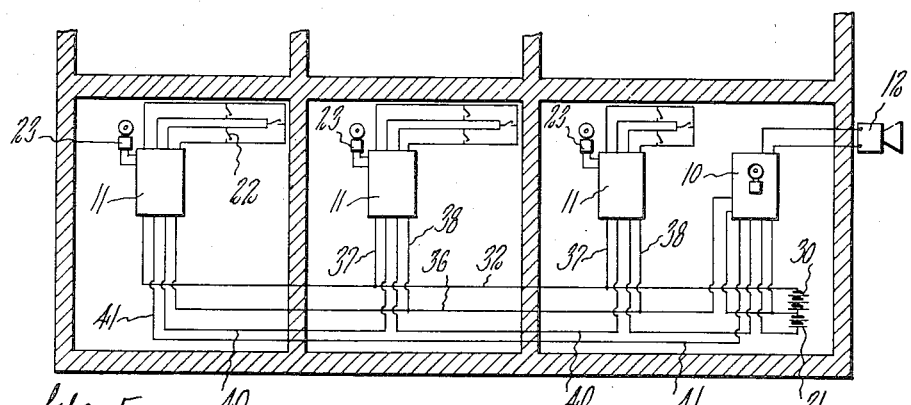
Figure 5 is a wiring diagram of a system embodying the invention, showing the connection between units such as are illustrated in Figure 1.
Figure 6:
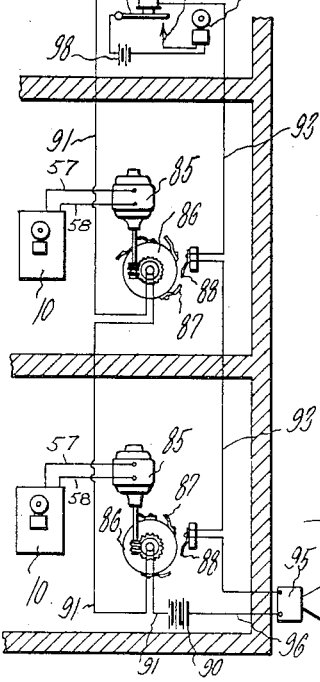
Figure 6 is a diagram showing the connection of a plurality of systems into a combined system.

The diagram illustrated in Figure 5 illustrates a complete system which can be utilized to take care of a number of rooms on one floor of a building such as a hotel or office building, or to take care of a number of buildings in a group. A plurality of such systems, however, can be connected together into a more elaborate combined system as indicated in Figure 6. In such case, each master panel 10 may be connected to a suitable motor 85 which, as shown in Figure 6, is preferably connected to the panel in place of the howler 12. The motor 85 may be employed to drive a signalling device, such as a disk 86 on which are mounted contact points 87 adapted to move successively into contact with a fixed point 88 as the disk 86 is revolved by the motor 85. The contacts 87 and 88 are connected into a normally closed circuit which includes a source of energy, such as a battery 90. The circuit extends from the battery 90 through a wire 91 to all the disks 86 in succession so that these disks are connected in series by the wire 91. On each disk the several points 87 are all connected to the wire 91. This may be done by employing a metal disk 86, provided it is suitably insulated from other portions of the apparatus. The wire 91 extends to a supervising magnet 92. From this magnet, a return wire 93 extends to the several points 88 so as to connect them in series, and thence extends to a signal or howler 95 which is actuated whenever any switch 22 in the entire apparatus closes. From the howler 95 a wire 96 extends back to the battery 90. Thus the howler 95, the battery 90 and the wires connecting these instruments with the contact points 87, 88 are all on a single normally closed circuit which also includes a supervising magnet 92. This magnet 92 cooperates with an armature 97 which is connected in a local trouble circuit including a battery 98, a contact point 99, and a trouble bell 100.

As is evident from the diagram in Figure 6, as long as the circuit through the magnet 92 is closed, the armature 97 is held in its upper position away from the contact point 99 so that the trouble circuit is normally open. If any wire or instrument in the circuit containing the battery 90 and the howler 95 fails, this circuit is thereupon opened, deenergizing the magnet 92 and allowing the armature 97 to operate the trouble bell 100. As the contact points 87 are brought into contact with the point 88 by rotation of the disk 86, this connection short-circuits the magnet 92 and throws the full voltage of the battery 90 through the central howler 95, causing the actuation of both the howler 95 and the trouble bell 100.

In the operation of the combined system as a whole, the closing of a switch 22 in any room of a building having a plurality of floors wired as shown in Figures 5 and 6 causes the actuation of the location bell 23 in the particular room. The motor 85 on the corresponding floor is also actuated. The location bell 23 and the motor 85 operate continually until shut off. The howler 95 sounds intermittently to give a signal adapted to indicate the particular floor containing the switch 22 closed by the disturbance. For this purpose the contact points 87 on the several disks 86 may be suitably arranged in groups. As illustrated in Figure 6 by way of example, a disturbance on the lower floor would cause the howler 95 to repeat the signal 1—2. A disturbance on the second floor would cause the howler to sound 1—3. These signals could obviously be varied as desired to indicate in any convenient way the respective floors, buildings, or other locations represented by the several disks 86.

Figure 7:
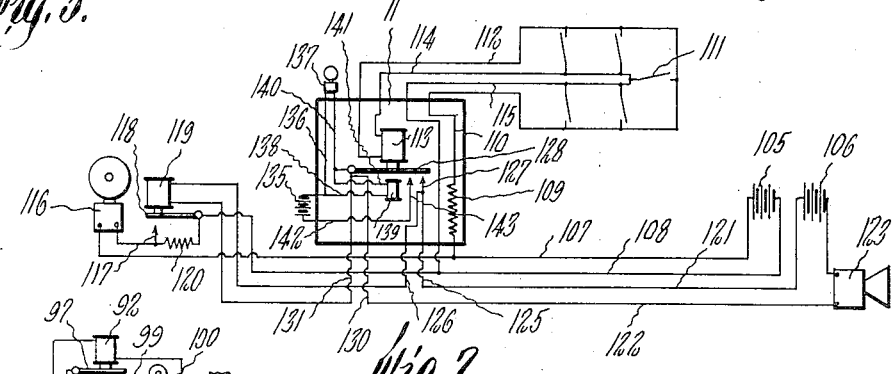
Figure 7 is a modified embodiment of the invention.

A slightly simplified alarm system embodying some aspects of the invention is illustrated in Figure 7. This system includes two circuits which supervise each other and include two separate sources of energy such as batteries 105 and 106. The first circuit comprises the battery 105 from which extend two trunk wires 107 and 108. These two wires are laid from the central station to the various locations to be protected, the remote ends of these wires being preferably brought back to the vicinity of the central station. This is not indicated on the drawings, but in actual installation in a building the trunk wires might be extended down one side of a corridor and back to the starting point along the opposite side of the corridor. At each of the various rooms or locations to be protected, a loop circuit is connected across the trunk wires 107, 108 as follows. From the trunk wire 107, a wire leads to a high resistance unit 109, thence by a wire 110 to one side of each of a series of normally open thermostatic or equivalent switches 111. The switches 111 may be located at any convenient point or points in the room, a return wire 112 leading back to the panel where it is connected with the windings of a high resistance relay magnet 113. From the magnet 113 a wire 114 extends in parallel with the wire 112 to the other side of the thermostats 111, this wire having a return wire 115 in series therewith which is directly connected to the trunk wire 108. At the ends of the trunk wires 107 and 108 remote from the battery 105 is a trouble bell 116, one side of this bell being connected directly to the trunk wire 107, the other side of the bell being connected to a contact point 117 which is adapted to be engaged by an armature 118 of a relay magnet 119. The trunk wire 108 is directly connected to the armature 118 and may be connected to the contact point 117 through a high resistance unit 120. If desired, the connection between the armature 118 and the point 117 through the resistance unit 120 may be omitted.

The second circuit comprises a pair of trunk wires 121 and 122 extending from the battery 106. A central howler 123 may be connected in series with the trunk wire 122. This howler is equivalent in location and function to the howler 12 illustrated in Figure 5 and may be mounted wherever the alarm will be most effective, as for example, on the outside of a building. At each room or locality to be protected, the trunk wire 121 is interrupted, the ends of the gap being connected by a loop comprising wires 125 and 126 which are joined at a contact point 127. This contact point is adapted to be engaged by an armature 128 of the relay magnet 113. In like manner the trunk wire 122 is interrupted at every location, the gap being bridged by a loop comprising wires 130 and 131, both of which are connected to the armature 128. At the ends of the trunk wires 121 and 122 beyond the last location to be protected is connected the windings of the relay magnet 119. Thus the second circuit is normally a closed circuit through the high resistance magnet 119, the normal current flowing through this circuit being too small to actuate either the howler 123 or the motor 124.

At each locality a local trouble and location circuit is provided as follows: From a local battery 135 a wire 136 extends to a local bell 137. A wire 138 branches from the wire 136 and extends to the windings of a magnet 139. From the bell 137 a wire 140 leads to the armature 128. A wire 141 leads from the magnet 139 to the armature 128. The other pole of the battery 135 is connected as by a wire 142 to a contact point 143 which is engageable by the armature 128. Thus when the magnet 113 is deenergized the armature 128 is allowed to drop into contact with the points 127 and 143 thus closing several circuits, including the circuit through the magnet 139. This holds the armature 128 in contact with the points 127 and 143 even should the magnet 113 be subsequently energized again.

The operation of the apparatus illustrated in Figure 7 is as follows: When any of the switches 111 closes, the magnet 113 is short circuited and thus deenergized. The armature 128 drops into contact with the points 127 and 143. Contact of the armature with the point 127 short circuits the hight resistance magnet 119 in the second main circuit, with the result that the full voltage of the battery 106 is thrown into the howler 123 to actuate this instrument. This connection is through the trunk wire 121, the connecting wire 125, the armature 128, the connecting wire 130, and the return trunk wire 122. At the same time the short circuiting of the magnet 119 results in its deenergization so that the armature 118 is permitted to fall into contact with the point 117, thus causing the bell 116 to sound as an additional alarm. The contact of the armature 128 with the point 143 not only energizes the local magnet 136, but also sounds the local bell 137 by which the location of the fire or of the disturbance may be readily determined. In order that a short circuiting of the magnet 113 by the closing of a thermostatic switch may not result in the short circuiting of all the magnets 113 in the different localities connected by the trunk wires 107 and 108, the resistancing 109 is used in series with the magnet 113.

Since the four trunk wires are all in normally closed circuits, all of these wires are supervised by the system of wiring illustrated. If, for example, the battery 105, or either of the trunk leads connected therewith, should fail, all of the magnets 113 beyond the point of failure would be deenergized and would thus start the operation of the corresponding local bells 137. The howler 123 would also sound, as would the trouble bell 116. Thus all portions of the first main circuit are supervised. In case of any failure of the second main circuit, including the battery 106 and the trunk wires 121, 122, the magnet 119 would be deenergized permitting the armature 118 to fall into contact with the point 117 and thus to sound the trouble bell 116. Instead of the howler 123, a motor 85 may be substituted in order to utilize this system as a part of a combined system such as is illustrated in Figure 6.

Figure 8:
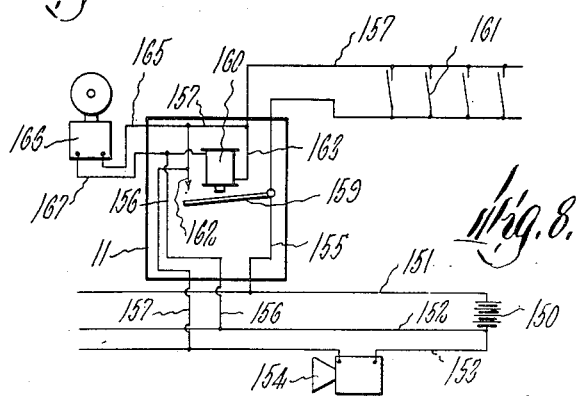
Figure 8 is another modified embodiment.

A simple open circuit system is illustrated in Figure 8, this system including a central signal, local signals at the various localities to be protected, and wiring for causing these signals to sound continuously after they have once been started, whether or not the thermostatic switches continue functioning. This embodiment of the invention may comprise a battery 150 with a trunk wire 151 connected to one pole thereof and two trunk wires 152 and 153 connected to the other pole thereof. A central howler 154 is connected in series with the trunk wire 153. At each local panel 11 branch wires 155, 156 and 157 lead respectively from the trunk wires 151, 152 and 153. The wire 155 is connected to an armature 159 of a relay magnet 160, the wire 155 also being connected to one side of a number of thermostatic switches 161. These switches are normally open, their other sides being connected through the wire 157 to the trunk wire 153. Connected to the wire 157 is a contact point 162 which is engageable by the armature 159 when the magnet 160 is energized. From the wire 157 a branch wire 163 leads to the magnet 160, the magnet also being connected at its other end through the wire 156 to the trunk wire 152. Branching also from the wire 157 is a wire 165 which leads to a location bell 166, this bell being also connected as by a wire 167 to the wire 156 and the trunk wire 152.

The operation of the system illustrated in Figure 8 is as follows: When any of the switches 161 closes, a circuit is established through the battery 150, the trunk wire 151, the branch wire 155, the closed switch 161, the return wire 157, the trunk wire 153 and the howler 154. This causes the actuation of the howler. Since the thermostatic switches 161 are usually located in positions exposed to a fire in the rooms to be protected, they are subject to destruction by a fire which may be present. It is desirable, therefore, to ensure the continued sounding of the howler 154 in spite of possible destruction of the switches 161. To this end the magnet 160 is provided. The closing of a switch 161 also closes a circuit through the magnet 160 since the wire 163 branches from the wire 157 and extends through the windings of the magnet 160 to the return wire 156 and the trunk wire 152. The energization of the magnet 160 pulls the armature 159 upward into contact with the point 162. This connects the wire 155 directly to the wire 157 independently of the switches 161, so that the circuit through the magnet 160 is thus maintained thereafter whether or not the switches 161 are subsequently opened or destroyed. Since the local bell 166 is connected across the wires 157 and 156, the closing of a switch 161 also causes the location bell to sound so that the location of the fire or other disturbance is thus indicated.

I claim:

1. An alarm system for a plurality of locations, comprising, first, second and third trunk wires extending to all said locations, a source of electrical energy connected across said first and second trunk wires, a second source of electrical energy connected across said first and third trunk wires, a normally closed loop circuit connected across said first and second trunk wires at each location, each loop circuit having connected therein in series a high resistance relay magnet and a high resistance unit, a relay switch at each location controlled by the local magnet so that the switch is opened when the magnet is energized and closed when the magnet is deenergized, a shunt around each said relay magnet containing a normally open detecting switch, a normally open loop circuit at each location connected across said first and third trunk wires, said normally open loop circuit including in series said detecting switch and said relay switch, an alarm signal, and means connected in said first trunk wire between its points of connection with its source of energy and the nearest normally closed loop switch respectively for controlling the actuation of said alarm signal in response to the closing of said relay switch.

2. An alarm system for a plurality of locations, comprising first, second, and third trunk wires extending to all said locations, a source of electrical energy connected across the first and second trunk wires, a second source of electrical energy connected across the first and third trunk wires, a loop circuit connected across said first and second trunk wires at each said location, each loop circuit having connected therein in series a high resistance relay magnet and a high resistance unit, a relay switch with and controlled by each said magnet so that each said switch is open when its magnet is energized and closed when its magnet is deenergized, a shunt around each said relay magnet containing a normally open detecting switch, a second loop circuit in each location connected across said first and third trunk wires, said second loop circuit including in series said detecting switch and the local said relay switch, an alarm signal and a normally open alarm switch in series with one of said sources of electrical energy, and a low-resistance electromagnet connected in said first trunk line and energizable by a relatively large current to close said alarm switch.

3. An alarm system for a plurality of locations, comprising two closed supervisory circuits each containing a source of electrical energy connected therein; one of said circuits including first and second trunk wires extending from its source of energy to all said locations in succession, the first of said trunk wires having connected therein a low-resistance alarm relay magnet, and a loop circuit across said trunk wires at each location, each said loop circuit having a local supervisory relay magnet and a high resistance unit connected in series therein, the resistances of said supervisory magnets and resistance units being sufficiently great to keep the current normally flowing through said alarm relay magnet below armature-actuating strength; the second said supervisory circuit consisting of a third trunk wire extending from its source of energy through the several successive locations and a fourth trunk wire leading back from its remote end of the third trunk wire to its said source of energy, said second circuit having connected in series therein an alarm signal and an alarm supervisory magnet; said first and fourth trunk wires being connected to each other adjacent to said sources of energy; each loop circuit in said first supervisory circuit having a short-circuiting shunt around its local supervisory magnet with a normally open detecting switch therein; a relay switch at each location held open by the local supervisory magnet when the latter is energized and adapted to close when the local supervisory magnet is short-circuited, one pole of said relay switch being connected to the third trunk wire, the other pole of said relay switch being connected to the local loop circuit at a point between the junction of the loop circuit with the first trunk wire and the local resistance unit, whereby, when any local relay magnet in the system is short-circuited, its local relay switch closes and thereby connects the third trunk wire with the first trunk wire so as to energize strongly said alarm relay magnet, an alarm relay switch operable by said alarm magnet to short-circuit said alarm supervisory magnet, and a trouble circuit associated with each said supervisory magnet, each said trouble circuit having an individual trouble signal and a normally open switch adapted to close when its supervisory magnet is short-circuited.

WILLIAM K. MASON.